S. TRAGHEIM.
Screw-Propeller.
No. 200,951. Patented March 5, 1878.
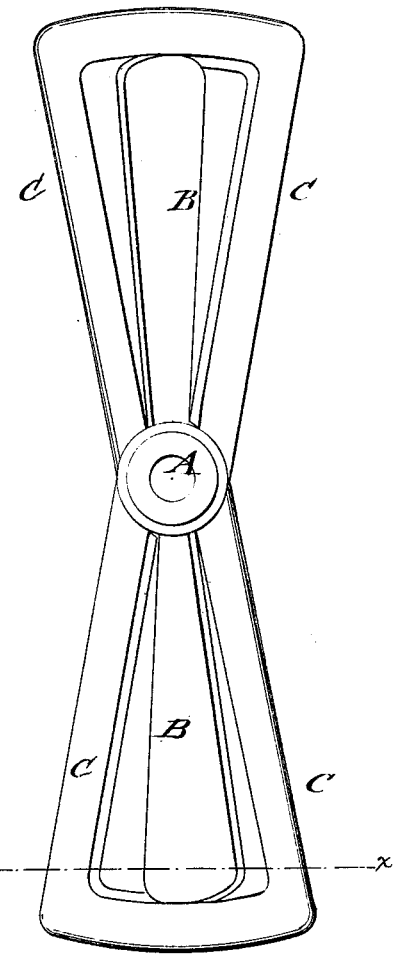
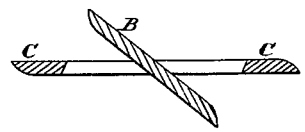
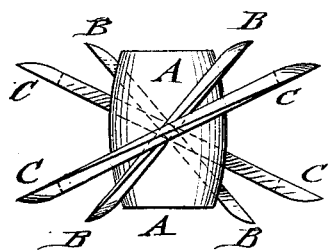

UNITED STATES PATENT OFFICE.

SIMON TRAGHEIM, OF NEW YORK, N. Y., ASSIGNOR TO DAVID S. RITTERBAND, OF SAME PLACE.

IMPROVEMENT IN SCREW-PROPELLERS.

Specification forming part of Letters Patent No. 200,951, dated March 5, 1878; application filed September 29, 1877.

*To all whom it may concern:*

Be it known that I, SIMON TRAGHEIM, of the city, county, and State of New York, have invented a new and Improved Screw-Propeller, of which the following is a specification:

In the accompanying drawing, Figure 1 represents a front view of my improved screw-propeller; and Fig. 2, a top view of the same. Fig. 3 is a cross-section on line $x\ x$ of Fig. 1.

Similar letters of reference indicate corresponding parts.

The object of this invention is to furnish for steam-vessels an improved screw-propeller that passes with greater facility through the water, admits the almost instant reversing of the vessel, and increases the power and strength of the screw, so as to obtain a greater effect, and expose the blades in a less degree to breakage.

The invention consists of a screw-propeller with blades strengthened by an outer frame, extending at both sides of the blade at an oblique angle of inclination to the same from the boss or hub outwardly and across the outer center-point of the blade. The front and rear edges of the strengthening-frames are beveled, to facilitate their cutting through the water.

Referring to the drawing, A represents the boss or hub of my improved screw-propeller, by which the same is secured to the shaft. B B are the blades, that are arranged on the boss with the usual approved pitch. The blades B B are strengthened by means of outer frames C, that are made of outwardly-flaring arms, extending from the boss, and of a connecting transverse piece that passes across the outer center-point of the blades, being welded thereto or cast in one piece with boss and blade.

The frame C is placed at an oblique angle of inclination to the plane of the blade B, and the outer front or rear edges beveled, for the easier cutting of the screw through the water. The effect of the outer frame C is, first, to strengthen the blades at the points of greatest strain, so as to reduce the frequent breaking of the blades; and, secondly, to increase the power of the screw as it first cuts the water in superior manner, and allows then the blade to act with full force on the water thus divided, so as to increase the thrust of the screw.

The propeller-screw is equally effective for reversing the motion of the vessel, working in exactly the same manner, but in opposite direction. The working-surface of the screw being increased and the action made duplex, a greater backward thrust is exerted on the water, and thereby a greater propelling power obtained.

Having thus described my invention, I claim as new and desire to secure by Letters Patent—

1. A propeller-screw made with blades of the usual pitch, and with strengthening-frames extending from the boss or hub at both sides and across the outer center-points of the blades, substantially in the manner and for the purpose set forth.

2. A propeller-screw made with blades of the usual pitch, and with strengthening-frames extending at an oblique angle of inclination to the plane of the blades from the boss of the screw outwardly at both sides of the blades, and across the outer center-points of the same, substantially as and for the purpose set forth.

3. A propeller-screw made with blades of the usual pitch, and with strengthening-frames extending at an angle of inclination to the blades from the boss outwardly at both sides of the blades, and across the outer center-points of the same, the front and rear edges of the strengthening-frames being beveled to facilitate the motion of screw and reversing of vessel, substantially as specified.

SIMON TRAGHEIM.

Witnesses:
PAUL GOEPEL,
C. SEDGWICK.